United States Patent [19]

Candea

[11] 4,125,014
[45] Nov. 14, 1978

[54] ENGINE OIL PUMP TEST ASSEMBLY

[75] Inventor: Cornell Candea, Clawson, Mich.

[73] Assignee: Chrysler Corporation, Highland Park, Mich.

[21] Appl. No.: 828,015

[22] Filed: Aug. 26, 1977

[51] Int. Cl.² .......................................... G01M 15/00
[52] U.S. Cl. ...................................... 73/49.7; 73/118
[58] Field of Search ................. 73/118, 119, 49.7, 168

[56] References Cited

U.S. PATENT DOCUMENTS

| 3,577,776 | 5/1971 | Brown | 73/119 A |
| 3,817,097 | 6/1974 | Heroux | 73/49.7 X |
| 3,943,760 | 3/1976 | Allen | 73/119 R |

*Primary Examiner*—Jerry W. Myracle
*Attorney, Agent, or Firm*—Baldwin & Newtson

[57] ABSTRACT

A test assembly for determining the acceptability of an engine driven lubrication oil pump without disassembling the pump from the engine. A conduit housing is provided for assembly on the engine in place of its oil filter. The housing fluidly communicates with a test valve assembly which carries the engine oil filter and is operative to direct or prevent fluid flow through the filter to the engine and includes means for measuring the pressure developed by the engine pump during flow prevented mode of operation and means for preventing operation in the flow prevented mode beyond a predetermined duration.

12 Claims, 4 Drawing Figures

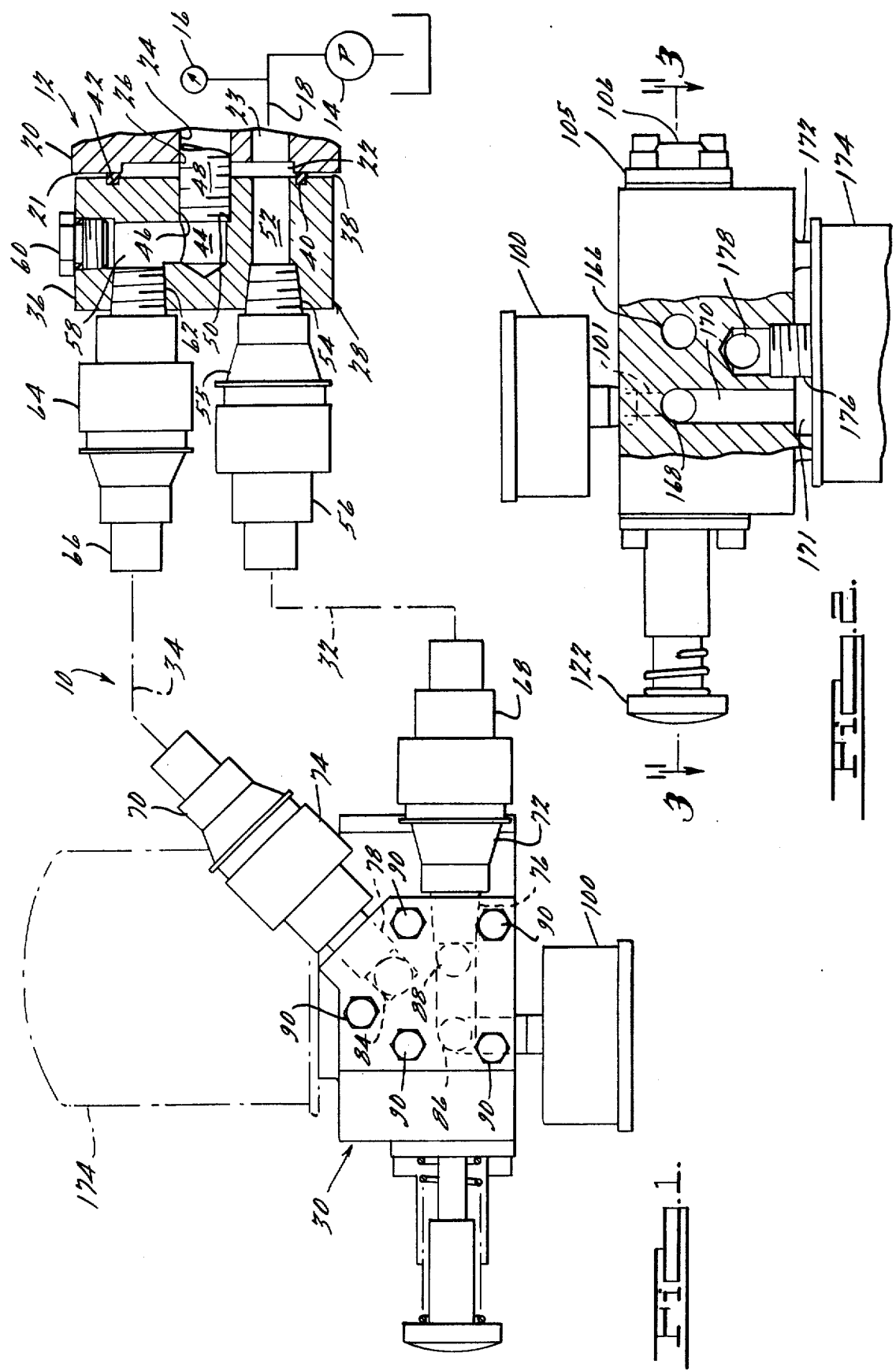

ENGINE OIL PUMP TEST ASSEMBLY

BACKGROUND OF THE INVENTION

1. Field of the Invention

The invention relates generally to valves and more particularly to valves installed for diagnosing failures in engine lubrication systems.

2. Description of the Prior Art

In internal combustion engines, particularly of the type employed in land vehicular propulsion, it has become customary to monitor the pressure of the engine lubrication system and to inform the engine operator of the monitored pressure or of a reduction in pressure below a predetermined minimum valve. This communication to the operator is, of course, intended to prevent unlubricated engine operation. Certain problems have been noted, however, in servicing engines or vehicles in which an indication of insufficient pressure has been noted. These relate to the fact that the sensing of reduced system pressure is indicative of more than one mode of failure in the lubrication system, some of which may be major failures such as failure of the engine oil pump itself, or failure, or impending failure of engine bearings. It may, however, merely indicate failure of the pressure monitoring portion of the system, a relatively minor failure. Since diagnosis of lubrication system failures has customarily been effected by removal and replacement of possibly causative components until the low pressure indication has been eliminated, there has been a danger of overlooking impending bearing failure and/or removal and replacement of non-deflective components such as engine lubrication pumps. This is an expensive, time consuming, undesirable occurrence which is brought about by the inability of service personnel to safely and effectively test an engine driven lubrication pump in its assembled operating condition. This inability arises from the fact that to check one of the prime failure indicia of the pump, its volumetric efficiency, in a simple, effective manner, it is necessary to block the pump outlet and check its capacity to build pressure to a desired level. No provisions are made to affect this blockage in engine installations, and, furthermore, blockage of excessive duration will result in damage to an engine operating without lubricating oil being supplied.

SUMMARY OF THE INVENTION

It is accordingly an object of the present invention to provide a test assembly for determining whether operating parameters of a lubrication pump installed in an engine are at acceptable levels.

It is another object to provide a test assembly which prevents damage to the engine during testing of its pump.

It is a further object to provide a test assembly operative to block flow from the engine mounted pump and to determine the pump outlet pressure to determine whether the volumetric efficiency of the pump is above a predetermined level.

It is a still further object to provide a test assembly operative to limit the duration of operation when flow from the pump is blocked to insure safe operation of the engine.

According to one feature of the invention means are provided to conduct fluid from an engine mounted pump externally to a fluid test assembly for monitoring operating parameters of the pump.

According to another feature, safety means are provided with the fluid test assembly for preventing damage to the engine through stoppage of fluid flow thereto.

According to a further feature the test assembly includes valve means selectively operable to block or permit flow from the pump to permit determination of the volumetric efficiency of the pump.

According to a still further feature other valve means are provided for limiting the duration of pump operation in the flow blocked condition to prevent damage to the engine.

BRIEF DESCRIPTION OF THE DRAWINGS

These and other objects and features will become apparent to those skilled in the art of testing apparati upon reading the following detailed description of a preferred embodiment with reference to the accompanying drawings in which:

FIG. 1 is a partially schematic, partially sectioned top elevational view of the invention test assembly as installed on an internal combustion engine;

FIG. 2 is a partially sectioned side elevational view of the test valve of the invention test assembly;

DESCRIPTION OF THE PREFERRED EMBODIMENT

Figure 3:
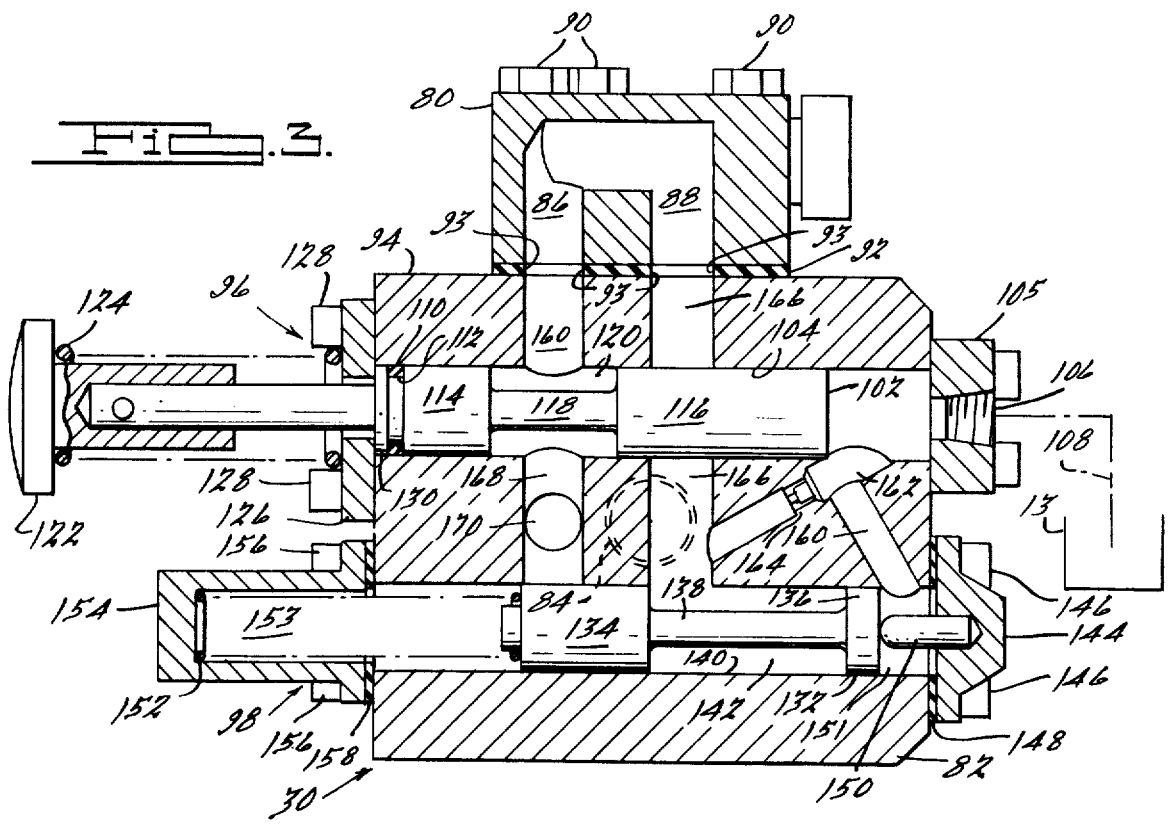
FIG. 3 is a cross sectional view of the test valve taken along line 3—3 of FIG. 2.
Figure 4:
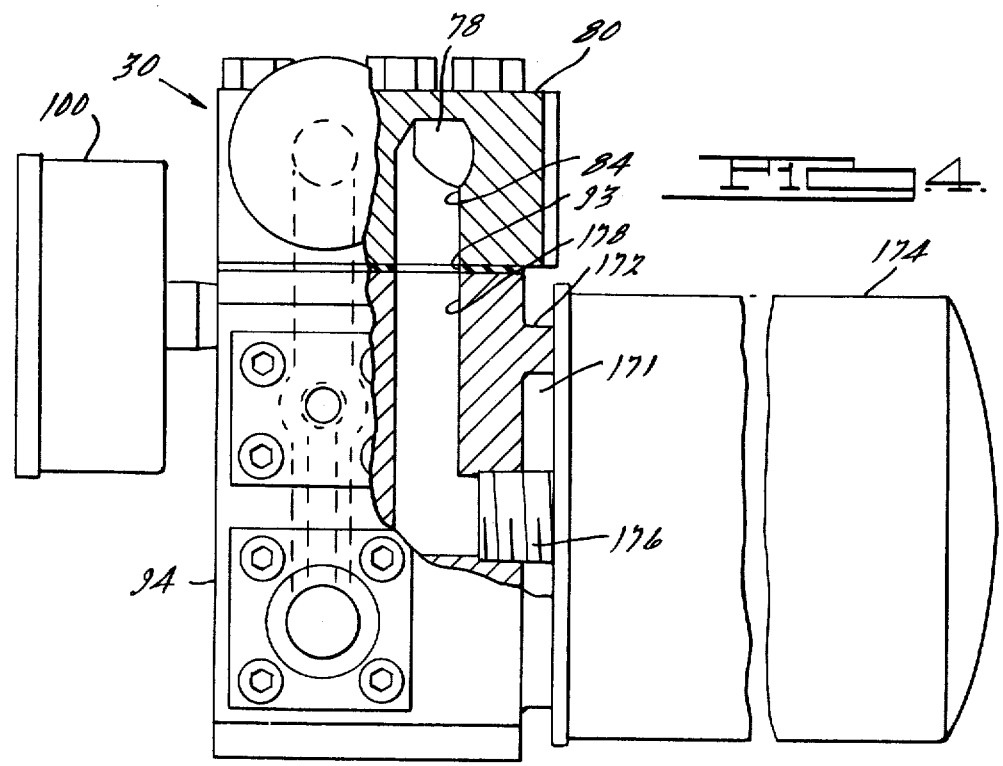
FIG. 4 is a partially sectioned side elevational view of the test valve taken in the direction of lines 4—4 of FIG. 2.

Referring now to FIG. 1, the invention fluid pressure test assembly 10 is illustrated as it is preferably installed for diagnosing the cause of an indication of low oil system pressure in an internal combustion engine 12.

The internal combustion engine 12 is provided with an engine driven pump 14 for supplying lubricating oil to certain portions of the engine. Since the delivery of the lubricating oil to moving engine parts is necessary for continuous operation, a pressure monitoring transducer 16 is in fluid communication with a passage 18 leading from the outlet of the pump 14 to allow operators of the engine 12 to be assured that fluid at sufficient pressure is available for lubrication. It is when this pressure monitoring transducer has indicated the occurrence of a fluid pressure below some predetermined minimum value at engine idle speed that the invention test assembly 10 is preferably employed to determine whether the pump 14 is functioning acceptably.

The engine 12 includes a filter mounting boss 20 having a flat mounting face 21 in which is formed an annular channel 22 communicating with a supply passage 23, which is in fluid communication at one end with the outlet of the pump 14 and which is normally in fluid communication at its other end through the annular channel 22, with the inlet of a conventional oil filter (not shown). Also formed through the filter mounting boss 20 is a lubrication supply passage 24 having an internally threaded outer end portion 26 in which the outlet port of the filter is engaged, usually by an externally threaded connector 48, to supply filtered, pressurized lubricating oil to the engine 12. It is through the filter mounting boss 20 and its associated passages 22, 23, and 24 that the invention fluid pressure test assembly 10 is employed to perform its diagnostic testing function.

The test assembly 10 generally comprises a conduit housing 28 adapted to engage the filter mounting boss 20 to conduct fluid to and from the passages 22, 23, and 24; a test valve assembly 30; and flexible conduits 32, 34 for effecting fluid communication between the housing 28 and the test valve assembly 30.

Considering now the conduit housing 28 in more detail, it is illustrated in FIG. 1 as comprising a body 36 having a flat mounting face 38 having an annular groove 40 formed therein for receiving a conventional sealing member 42. A centrally located bore 44 extends from the mounting face 38 and has an internally threaded portion 46 adjacent the mounting face 38. The externally threaded connector 48 of the engine 12 is received in the threaded portion 46 to permit installation of the conduit housing assembly 28 on the engine 12 in place of the engine oil filter. As the threaded portion 46 is threadedly advanced onto the connector 48, the sealing member 42 is brought into sealing abutting engagement with the mounting boss flat face 21.

A bore 52 is formed through the body 36 to communicate with the pump discharge passage 22, 23. It includes a threaded portion 54 preferably configured to receive one half of a quick disconnect coupling 55 by which it may be coupled to a mating connector 56 at the end of flexible conduit 32.

A cross bore 58 extends perpendicularly outward from the central bore 44 and is illustrated in FIG. 1 as being plugged at its outer terminus 60. An axially extending bore 62 intersects the bore 58 and includes a threaded portion preferably configured to receive one half of a quick disconnect coupling 64 by which it may be coupled to a mating connector 66 at one end of flexible conduit 34.

The other ends of flexible conduits 32, 34 include quick disconnect members 68, 70, respectively, whereby connection is made to mating connectors 72, 74, respectively, which are received in threaded ports 76, 78 of the test valve assembly 30.

Turning now to the test valve assembly 30, it is illustrated, as may best be seen in FIG. 3, as generally comprising a port housing 80 and a valve housing assembly 82.

The port housing 80 includes an outlet passage 84 intersecting the partially threaded outlet port 78 and a pair of inlet passages 86, 88 intersecting the partially threaded inlet port 76. Suitable fasteners 90 secure the port housing to the valve housing assembly 82, clampingly engaging a seal, such as a gasket 92 therebetween. The gasket 92 includes through holes 93 registering with the passages 84, 86, and 88.

The valve housing assembly 82, as may best be seen in FIGS. 2 and 3, includes a housing 94, a selector valve assembly 96, safety valve assembly 98, and a pressure monitor here illustrated as a pressure gage 100.

The selector valve assembly 96 includes a spool member 102 slidingly received in a bore 104 formed through the housing 94 and terminating at one end in a housing 105 defining a port 106 which is preferably connected by a conduit such as that indicated schematically as 108 to a vented sump indicated schematically as 13 such as the oil pan of the engine 12. The other end of the bore 104 is sealed from the atmosphere by a sliding seal 110 carried in a groove 112 formed in the outer periphery of a first land 114 of the spool member 102. A second, elongated land 116 is spaced from the first land 114 to define with a reduced connecting portion 118 and the bore 104 an annular chamber 120. An actuating plunger 122 may be integrally formed with or secured to the end of the spool member 102 as may best be seen in FIG. 3.

A return spring 124 is preferably grounded between the plunger 122 and a seat member 126 which is secured to the housing 94 by suitable fasteners 128 and which serves to restrain outward movement of the spool member 102 at 130.

The safety valve assembly 98 includes spool member 132 having an elongated land 134 and a shorter land 136 spaced therefrom by a reduced diameter section 138 to define with a bore 140 formed through the housing 94 an annular chamber 142. An end cap 144 closes one end of the bore 140. It is secured to the housing 94 by suitable fasteners 146 and compressively engages a sealing member 148 to prevent outward leaking from the housing 94. A stop member, such as a pin 150 is received in the cap 144 and projects therefrom to prevent movement of the spool member 132 to the end of the bore 140. A chamber 151 adjacent the cap 144 is thereby defined.

To normally urge the spool member 132 toward the pin 150, a spring 152 is grounded between the spool 132 and a cap 154 which is fastened to the housing 94 by fasteners 156 and compressively sealingly engages a seal member 158.

A communication passage 160 extends from the chamber 151 to a bleed passage 162 which intersects the bore 104 of the selector valve assembly. A fixed orifice 164 is installed in the passage 162, which extends to intersect a flow passage 166 passing from the bore 140 through the bore 104 to meet the inlet passage 88.

Another flow passage 168 extends parallel to but spaced from the passage 166 from the bore 140 through the bore 104 to intersect the inlet passage 86.

A filter inlet passage 170 intersects the bore 168 intermediate the bores 104, 140 and extends therefrom, as may best be seen in FIG. 2, to an annular chamber 171 formed in a filter mounting boss 172 configured to receive an engine oil filter 174 by means of a threaded outlet connector 176. Also intersecting the bore 168 is a pressure monitoring passage 101 whereby the pressure upstream of the selector valve assembly 96 may be sensed by the pressure monitor 100. A filter outlet passage 178 extends parallel to the passage 170 from the port 176 to intersect the outlet passage 84 and outlet port 78 of the port housing 80.

OPERATION OF THE PREFERRED EMBODIMENT

When installed on the internal combustion engine 12 as illustrated in the drawings, the invention test assembly may be employed to determine the performance of the engine mounted pump 14 in the following manner:

Upon starting the engine 12, fluid is transferred by the pump 14 from the engine's vented reservoir 13 through the pump outlet passages 18, 23, 22, the conduit housing through bore 52, and the flexible conduit 32, to the test valve assembly inlet passage 76. When selector valve assembly 96 is in the assembled position shown, fluid is prevented from flowing through inlet passage 88 since the elongated land 116 of selector valve spool 102 is positioned to block the bore 166. Fluid is free to flow, however, through the passage 86 and the bore 168, which is opened by the annular chamber 120. The fluid is thereupon free to flow through the filter inlet passage 170 to the annular chamber 171 and thence inwardly through the filter 174 in a well known manner to the filter outlet passage 178 by which it passes to the outlet port 78. The fluid then passes through the flexible conduit 34 to the conduit housing bores 62, 58, 44 and on to the engine lubrication supply passage 24.

Upon depressing the plunger 122 inwardly until the bottom of the plunger 122 abuts cover 126 and the spool 102 is moved fully inwardly to completely block passage 162. Upon first attaining this position, flow through inlet passage 86 is prevented by the blockage of bore 168 by the outer land 114 of the selector valve spool 102. Annular cavity 120 is simultaneously positioned to open the bore 166, but flow through the inlet passage 88 is limited to that which can be passed through the fixed orifice 164 since the lower end (as viewed in FIG. 3) of the bore 166 is blocked by the elongated land 134 of safety valve spool member 132. During this mode of operation, the outlet pressure developed by the pump working against this severe restriction can be measured by the pressure monitor 100 in communication with the blocked passage 168. Pressure in excess of a predetermined value denotes acceptable pump volumetric efficiency.

Continuous operation of the engine 12 with the selector valve assembly 96 in the described blocking position is undesirable since no fluid is transmitted to the lubrication supply passage 24 of the engine 12. In the case in which the pump 14 is not failed, the length of time in which fluid transfer is prevented is limited to less than 10 seconds by appropriate sizing of the orifice 164 to control the rate of movement of the safety valve assembly 98. Fluid passes through the orifice 164 and the bleed passage 162 to the communication passage 160 and thence to the chamber 151 to pressurize the full area of the shorter land 136 to safety valve spool 132. Since the chamber 153 housing the spring 152 at the outer end of the spool 132 is vented to atmosphere in a known manner, this pressurization of the land 136 moves the spool 132 leftward as viewed in FIG. 3. This movement continues until the spool 132 is stopped by the cap 154. In this position passages 166 and 168 are in fluid communication through the chamber 142 and fluid passes from the passage 168 to the filter inlet passage 170 and thence to the engine lubrication supply passage 24 as previously described.

Release of the plunger 122 permits the return of the selector valve spool 102 to the assembled position shown by operation of the return spring 124. This drops the pressure in the passage 162 adjacent the bore 166 and opens the chamber 151 to the vented reservoir 13, permitting return of the spool 132 to its illustrated position under the urging of the spring 152.

While only one preferred embodiment of the invention test assembly has been described, others may be made without departing from the scope of the appended claims. For example, other lubrication system parameters such as flow, temperature, and filter differential pressure could be monitored during testing by routine modification of the disclosed structure; and filtration during testing might be eliminated by bypassing the filter 174.

The description above is intended for purposes of illustration and not limitation.

What is claimed is:

1. A fluid pressure test assembly for an engine having a lubrication oil pump driven thereby and a filter mounted thereon fluidly intermediate said pump and a portion of said engine, the test assembly comprising:
   A. housing means adapted to be mounted on said engine in place of said filter and including means defining a fluid inlet port fluidly communicating at one end with the outlet of said pump and a fluid return port fluidly communicating at one end with said engine portion: and
   B. test valve means in fluid communication with the other end of said housing means fluid inlet port and the other end of said housing means fluid outlet port and including:
      1. a selector valve assembly operative in one condition to port fluid from said inlet port to said outlet port and in another condition to prevent the flow of fluid therebetween;
      2. means for determining the fluid pressure between said pump and said selector valve assembly; and
      3. a safety valve assembly operative to bypass said selector valve assembly to permit fluid communication between said inlet port and said outlet port after a predetermined duration of engine operation with said selector valve assembly being operative in said other condition.

2. A fluid pressure test assembly as defined in claim 1 wherein said test valve means further includes:
   4. filter means positioned fluidly downstream of said selector valve assembly and said safety valve portion and upstream of said fluid return port.

3. A fluid pressure test assembly as defined in claim 1 wherein said test valve means further includes filter means positioned fluidly intermediate said selector valve assembly and said housing means fluid return port.

4. A test assembly for determining the volumetric efficiency of a lubrication pump having a fluid inlet and a fluid outlet and drivingly engaged with a prime mover, the test assembly comprising:
   A. test valve means including:
      1. housing means including means defining a fluid inlet port and a fluid return port;
      2. a selector valve assembly carried in said housing means and operative in one condition to port fluid from said housing means fluid inlet port to said housing means fluid outlet port and in another condition to prevent the flow of fluid therebetween;
      3. a safety valve assembly operative to fluidly bypass said selector valve assembly to permit the flow of fluid between said housing means inlet port and said housing means outlet port after a predetermined duration of engine operation with said selector valve assembly operative in said other condition; and
      4. means fluidly communicating with said housing means and operative to monitor a fluid parameter indicative of said pump volumetric efficiency; and
   B. means for effecting fluid communication between said pump fluid outlet and said housing means fluid inlet port and between said pump fluid inlet and said housing means fluid return port.

5. A test assembly as defined in claim 4 wherein said means operative to monitor comprises means for indicating the fluid pressure intermediate said pump outlet and said selector valve assembly whereby the maximum fluid pressure developed by said pump when said selector valve assembly is operative in said other condition may be determined.

6. A test assembly as defined in claim 4 wherein said test valve means further includes filter means positioned fluidly intermediate said selector valve means and said fluid return port.

7. A test assembly as defined in claim 4 wherein said test valve means further includes filter means positioned fluidly downstream of said selector valve means.

8. A test assembly as defined in claim 4 wherein said test valve housing means further includes means defining a first inlet passage means fluidly communicating at its one end with said housing means fluid inlet port and at its other end with said housing means fluid return port, and wherein said selector valve assembly includes a valve member moveable between a first position wherein said first fluid inlet passage is open and a second position wherein said first inlet passage is blocked.

9. A test assembly as defined in claim 4 wherein said test valve housing means further includes means defining first and second inlet passage means, said first inlet passage means fluidly communicating at its one end with said housing means fluid inlet port and at its other end with said housing means fluid return port and said second inlet passage means fluidly communicating at its one end with said housing means fluid inlet port and at its other end with said safety valve assembly; said selector valve assembly comprises a valve member moveable between a first position corresponding to said one condition wherein said first inlet passage is open and said second inlet passage is blocked and a second position corresponding to said other condition wherein said first inlet passage is blocked and said second inlet passage is open; and said safety valve assembly comprises a valve member moveable between a normal position wherein fluid communication between the other ends of said first and second inlet passages is prevented and a bypassing position wherein said fluid communication is effected, and means operative to move said safety valve assembly valve member from said normal position to said bypassing position when said selector valve assembly valve member remains in said second position for a predetermined length of time when said pump is operating to deliver fluid to said housing means fluid inlet port.

10. A test assembly as defined in claim 9 wherein said safety valve assembly valve member includes a pressure responsive portion and said safety valve operative means comprises passage means for transmitting fluid from said second inlet passage other end to said pressure responsive portion and means for limiting the rate at which said fluid transmitting is effected.

11. A test valve assembly as defined in claim 10 wherein said rate limiting means comprises a fixed orifice disposed within said passage means.

12. A test valve assembly as defined in claim 10 wherein said selector valve assembly valve member is further operative in said first position to permit venting of said passage means to atmosphere and in said second position to prevent venting of said passage means to atmosphere.

* * * * *